Feb. 28, 1961 A. J. STEPHENS Re. 24,940

HUB SEALING MEANS

Original Filed May 9, 1958

INVENTOR.
ALLEN J. STEPHENS
BY
ATTORNEY

United States Patent Office

Re. 24,940
Reissued Feb. 28, 1961

24,940

HUB SEALING MEANS

Allen J. Stephens, 1144 Broadway, Denver, Colo.

Original No. 2,896,979, dated July 28, 1959, Ser. No. 734,212, May 9, 1958. Application for reissue Mar. 18, 1960, Ser. No. 16,111.

8 Claims. (Cl. 286—11)

Matter enclosed in heavy brackets [ ] appears in the original patent but forms no part of this reissue specification; matter printed in italics indicates the additions made by reissue.

This invention relates to a sealing device for sealing fluid lubricating oil in the hub of a rotating element, and while more particularly applicable for use in adapting idling vehicle wheels, such as used on trailers and the like to the use of oil lubricants, it is not limited to this particular use, but will be found valuable wherever it is desired to seal the hub of a rotating element against leakage of a lubricant.

Idler wheels such as used on trailers and similar vehicles, are usually lubricated with hard oil or axle grease, since it has been found difficult to retain fluid oil in the bearings thereof. The principal object of this invention is to provide a leak proof, long lived, wheel oil seal which will enable fluid oil to be effectively used for wheel lubrication without leakage, and to so construct the improved wheel oil seal that it can be quickly and easily installed in present grease type wheel hubs without requiring any changes in the latter, and without the use of special tools.

One of the difficulties encountered in producing oil tight wheel hubs is due to the movement of the hub on the axle spindle in an axial direction due to play in the conventional conical wheel bearings. Another object of this invention is to provide a sealing ring which will resiliently follow the axial movements of the hub so as to maintain a perfect seal at all axial positions of the hub.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 1:
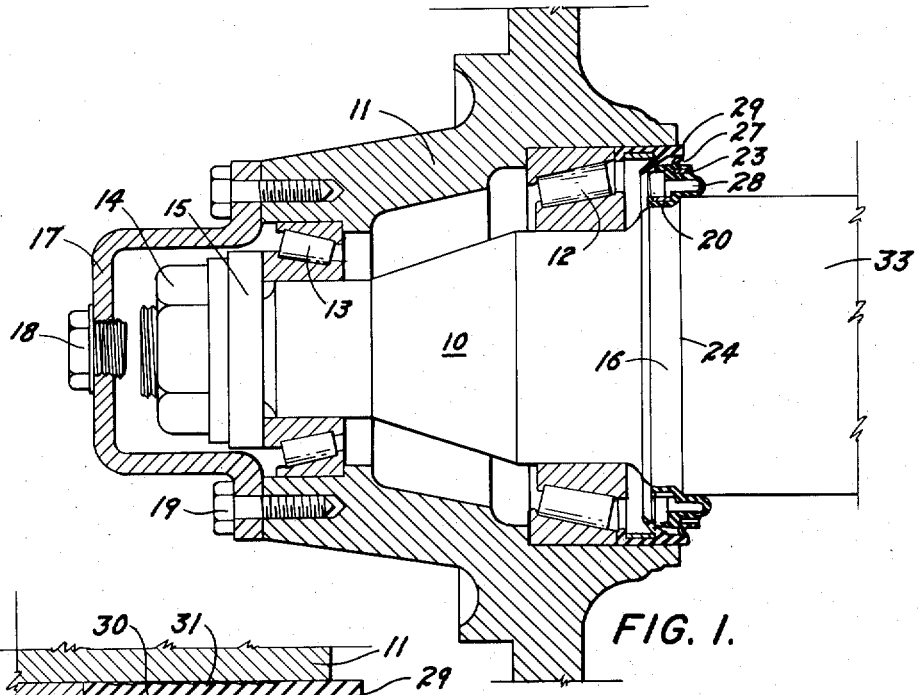
Fig. 1 is a fragmentary, diametric, *section* [view] through the hub [of a section] of a conventional trailer wheel illustrating it in place on a typical axle spindle with the improved wheel oil seal in place therein.

For the purpose of illustrating the working position of the improved wheel oil seal, a conventional vehicle axle is indicated at 33, having an axle spindle at 10, with a hollow wheel hub 11 rotatably mounted thereon by means of a rear roller bearing 12 and a forward roller bearing 13. As usual, the wheel hub is retained in place by means of an axle nut 14 and retaining washers 15 which act against a spindle enlargement 16 on the spindle 10. The enlargement 16 terminates against a spindle shoulder 24 from which the vehicle axle extends. For the purposes of this invention, the entire hub is sealed about the axle nut 14 by means of a hub sealing cap 17 preferably provided with an oil plug 18. The cap 17 is secured in place on the hub by means of cap screws 19 so as to retain a supply of fluid lubricant within the hollow hub structure.

Figure 4:
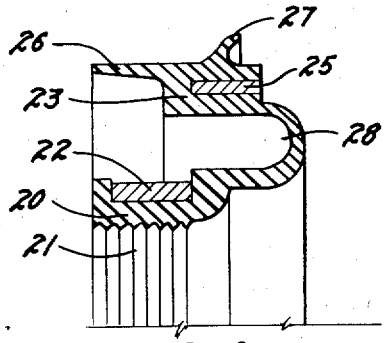
Fig. 4 is a similar section taken on the line 4—4, Fig. 2, showing the resilient sealing ring as it would appear when disassembled from the wheel oil seal assembly.

The improved wheel oil seal employs an annular resilient, sealing ring molded from any suitable non-metallic flexible material, such as tread-stock rubber, neoprene, or the like, and having an initial cross-section, as shown, in the enlargement of Fig. 4. The sealing ring is molded to provide an axle sleeve portion 20 having a normal internal diameter slightly less than the enlargement 16 so that it may be forced over the latter to snugly and rigidly engage the outer surface thereof. The sleeve portion 20 is provided with internal serrations 21 to seal it fluid-tight on the enlargement 16 of the spindle 10. The spindle sealing effect is enhanced by means of annular, metallic, confining band 22 of fixed diameter which is embedded in and about the sleeve portion 20 to be compressed about the spindle.

An outer cylindrical rim portion 23 is molded integrally with the sleeve portion 20 and surrounds the latter in concentric spaced relation thereto. The rim portion 23 is provided with a second confining band 25 of fixed diameter which is embedded in the rear face thereof to prevent radial expansion of the rim portion. A relatively thin flexible annular skirt 26, having an outer diameter equalling the outer diameter of the rim portion 23, projects forwardly from the latter about its entire circumference and a relatively thin flexible annular lip 27 is formed on and completely surrounds the rim portion 23.

The rim portion 23 is joined to the sleeve portion 20 throughout the entire circumference of the rear faces of both by means of an annular roll portion 28. The roll portion 28 is formed with a thinner wall section than the other portions of the sealing ring so as to be exceedingly flexible, and is formed with a U-shaped cross section with the two sides of the U extending in an axial direction and joining the rear edges of the sleeve portion 20 and the rim portion 23 so that the portions 20 and 23 can be resiliently moved axially relative to each other by imparting a rolling action of the roll portion 28.

The sealing ring is used in combination with a cylindrical hub ring 29 having a normal external diameter slightly in excess of the internal diameter of the rear face of the wheel hub 11. The hub ring is provided with an inner metallic reinforcing band 30, of a fixed diameter less than the inner diameter of the hub 11, and with internal sealing serrations 31. The hub ring is adapted to be forced into the open rear face of the hub so that the reinforcing band 30 will compress the material of the ring and flatten the serrations 31 against the internal surface of the hub to form a fixed, fluid-tight joint therebetween.

The hub ring 29 is preferably molded from relatively stiff tread-stock rubber and is provided with an internal conical flexible throat member 32 of tapering cross section. The throat member inclines axially and forwardly on a smooth conical incline and has a terminal or minimum diameter which is less than the outer diameter of the rim portion 23 of the sealing ring.

The improved wheel oil seal is installed by removing the wheel hub 11 and its bearings 12 and 13 from the axle spindle 10. The sleeve portion 20 is then forced into place over the enlargement 16 on the spindle 10 and against the spindle shoulder 24. The hub ring 29 is now forced into the rear face of the opening in the hub 11 and against the race of the rear bearing 12. The wheel hub 11 and the retaining nut 14 are now replaced and the hub cap 17 is secured thereover by means of the cap screws 19. The hub is then partially filled with fluid lubricant and, with the oil plug 18 replaced, the wheel is ready for use.

Figure 3:
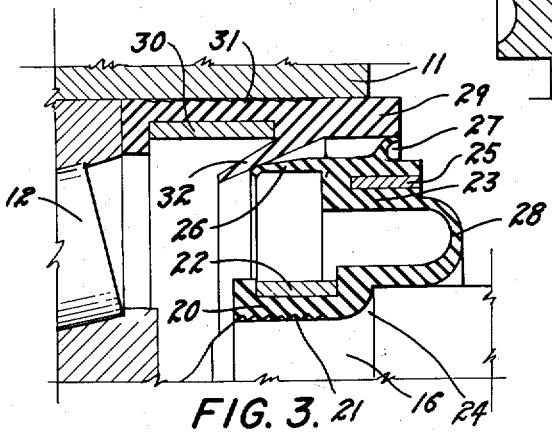
Fig. 3 is an enlarged, fragmentary, detail section through the sealing ring as it would appear when in place in the hub.
Figure 2:
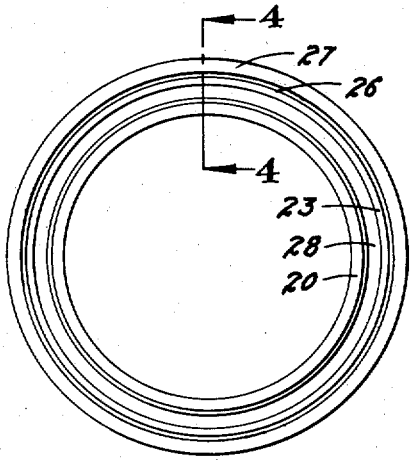
Fig. 2 is a face view of a resilient sealing ring employed in the improved wheel oil seal.

It will be noted that, as the wheel hub 11 is slid into place, the conical inner surface of the annular throat member 32 on the hub ring 29 will contact the annular skirt 26 of the sealing ring, forcing the skirt 26 and the rim portion 23 axially rearward from its normal position, as shown in Fig. 4 to the rearwardly depressed position of Fig. 3 and against the bias of the resiliency of the roll portion 28. The hub ring 29 and its throat member 32, of course, rotate with the wheel hub 11, and the stationary resilient skirt 26 maintains a tight frictional contact at its flexible free edge with the conical inner surface of the rotating throat member 32 to prevent the escape of lubricant therebetween throughout the entire circumference. Lubricant cannot escape between the hub ring 29 and the hub 11 due to the compressive action of the reinforcing band 30 and the serrations 31. Lubricant cannot escape between the spindle and the sleeve portion 20 of the sealing ring due to the compressive action of the confining band 22 and the serrations 21.

The outer diameter of the lip 27 is normally greater than the inner diameter of the hub 11 so that as the hub 11 is forced to its riding position, it will slightly flex the lip 27 rearwardly to provide a tight frictional dust seal between the sealing ring and the hub to prevent the entry of foreign matter to the frictional surfaces of the skirt 26 and the throat member 32 so as to reduce wear to a minimum.

However, should any wear occur, between the surfaces which are in frictional engagement or in the wheel bearings 12 and 13, it will be automatically accommodated by the tendency of the roll portion 28 to resume the normal position of Fig. 4. The latter tendency will always act to urge the rim portion 23 and the skirt 26 of the sealing ring forwardly so as to follow any forward shift of the hub.

On some types of axle spindles the enlargement 16 is not formed on the spindle itself but comprises a removable spacer ring having a shape and contour corresponding to the enlargement illustrated. Such a type does not effect or change this invention in any way for the sleeve 20 of the sealing ring is simply fitted over the spacer ring which replaces the enlargement.

While a specific form of the improvement has been described and illustrated herein, it is to be understood that the same may be varied within the scope of the appended claims, without departing from the spirit of the invention.

Having thus described the invention what is claimed and desired secured by Letters Patent is:

1. Means sealing a wheel hub on an axle spindle comprising: a hub ring fitted in said hub about said spindle; an annular throat member projecting radially inward from said hub ring toward said spindle; a sealing ring sleeve fitted over said spindle within said hub ring; an annular skirt carried by said sealing ring sleeve, said skirt projecting axially toward and into contact with said throat member; resilient means formed on and connecting said skirt and sleeve and acting to continuously urge said skirt in an axial direction toward said throat member; and an annular rigid confining band positioned to prevent radial expansion of said [skirt] *sleeve*.

2. Means sealing a wheel hub as described in claim 1 in which the resilient means connecting said skirt and sleeve comprises an annular, resilient, U-shaped roll, the extremities of the U being joined about their peripheries to the sealing sleeve and to the skirt respectively, and the sides of the U lying in concentric relation to the axis of said spindle; *and* a rim portion concentrically surrounding and spaced from said sleeve, said rim portion being joined to and interposed between said skirt and said U-shaped roll [and the annular, rigid confining band positioned in said rim portion to prevent radial expansion of the latter].

3. Means sealing a wheel hub as described in claim 2 having a second annular, rigid confining band positioned about said sleeve and acting to prevent radial expansion of said sleeve on said spindle.

4. Means sealing a wheel hub as described in claim 3 having an annular, rigid, reinforcing band in said hub ring and acting to prevent movement of the latter toward said spindle.

5. Means sealing a wheel hub as described in claim 2 in which the throat member presents a conical surface to said skirt so that the pressure imparted by said U-shaped roll will tend to direct the edge of said skirt radially inward.

6. Means sealing a wheel hub on an axle spindle comprising: a hub ring fitted in said hub about said spindle; an annular throat member projecting radially inward from said hub ring toward said spindle; a sealing ring sleeve fitted over said spindle within said hub ring; an annular rim portion concentrically surrounding and spaced from said sleeve; an annular resilient roll joined to the rear of said sleeve throughout its circumference and extending rearwardly from said sleeve thence outwardly and forwardly in an arcuate roll to a juncture with the rear of said annular rim portion; a flexible, annular skirt formed on and projecting forwardly from the front of said rim portion into contact with said throat member, the inherent resiliency of said roll acting to maintain said skirt in frictional engagement with said [skirt] *throat member*; and a rigid confining ring embedded in said [rim portion] *sealing ring sleeve* and acting to prevent radial expansion of the latter.

*7. In a device for sealing a wheel hub on an axle spindle the combination of a circular hub ring fitted into the rear extremity of said hub; a sealing ring sleeve fitted about said spindle within said hub ring; an annular conical member affixed to, and within, said hub ring and having a conical inner surface inclining forwardly and radially inward from said ring; a roll, having a cross sectional shape of a sidewardly turned* U, *affixed to and surrounding said sealing ring sleeve said roll having an outer and an inner cylindrical side, said cylindrical sides being positioned in concentric, spaced-apart relation and joined together at their rears by an annular arcuate resilient joining roll which allows the outer cylindrical side to move [more] resiliently in an axial direction relative to the inner cylindrical side; and a normally cylindrical flexible, tapering, skirt mounted on and projecting forwardly from the outer cylindrical side of said roll into frictional engagement with the inner surface of said conical member, said skirt being flexed radially inward by its frictional contact with said conical inner surface.*

*8. In a device for sealing a wheel hub on an axle spindle, the combination of a circular hub ring fitted into the rear extremity of said hub; a sealing ring sleeve fitted about said spindle within said hub ring; an annular conical member affixed to, and within, said hub ring and having a conical rear surface inclining forwardly and radially inward from said hub ring; and a substantially cylindrical flexible skirt mounted on and projecting forwardly from said sealing ring sleeve into frictional engagement with the conical rear surface of said conical member, said skirt being flexed radially inward by it frictional contact with said conical surface.*

References Cited in the file of this patent or the original patent

UNITED STATES PATENTS

| | | |
|---|---|---|
| 2,009,281 | Stein | July 23, 1935 |
| 2,657,104 | Kayser | Oct. 27, 1953 |
| 2,705,164 | Dasse | Mar. 29, 1955 |
| 2,750,011 | Pringle | June 12, 1956 |